G. W. WALK.
WHEEL.
APPLICATION FILED OCT. 19, 1915.
1,193,639.
Patented Aug. 8, 1916.
2 SHEETS—SHEET 1.
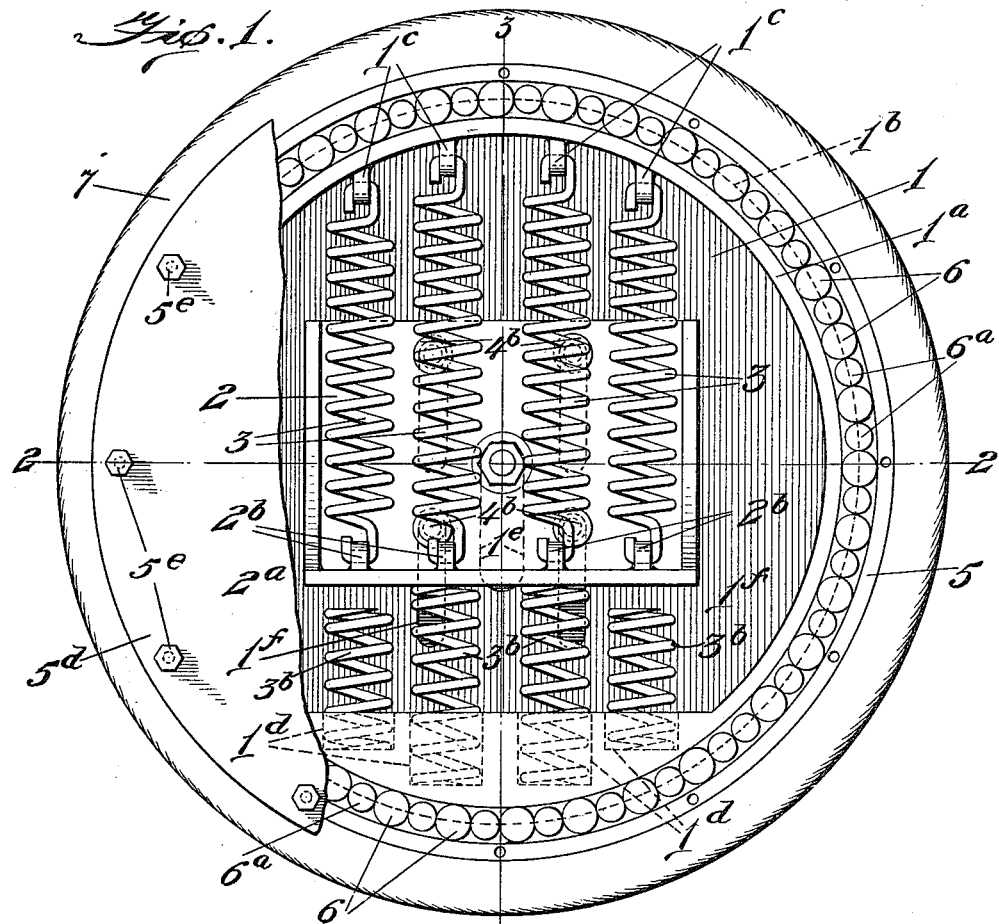
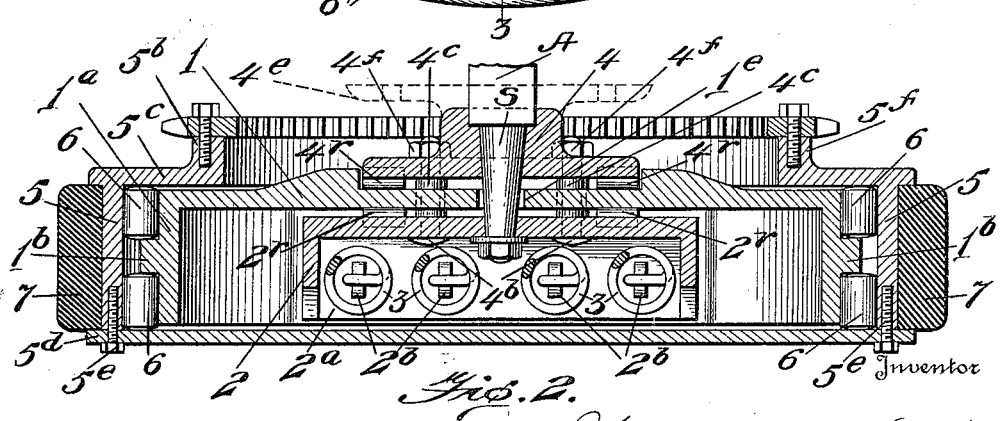
Witnesses
Inventor
George W. Walk
By Sowell & Sowell
Attorneys G. W. WALK.
WHEEL.
APPLICATION FILED OCT. 19, 1915.
1,193,639.
Patented Aug. 8, 1916.
2 SHEETS—SHEET 2.
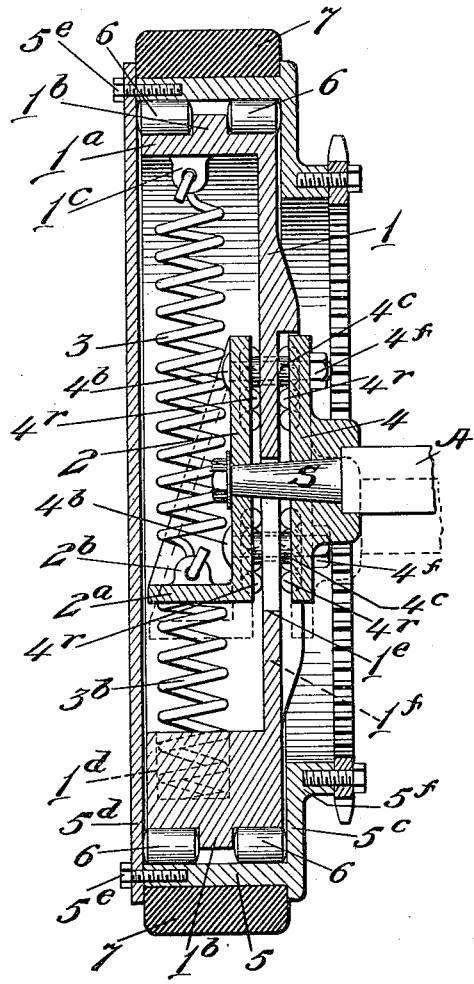
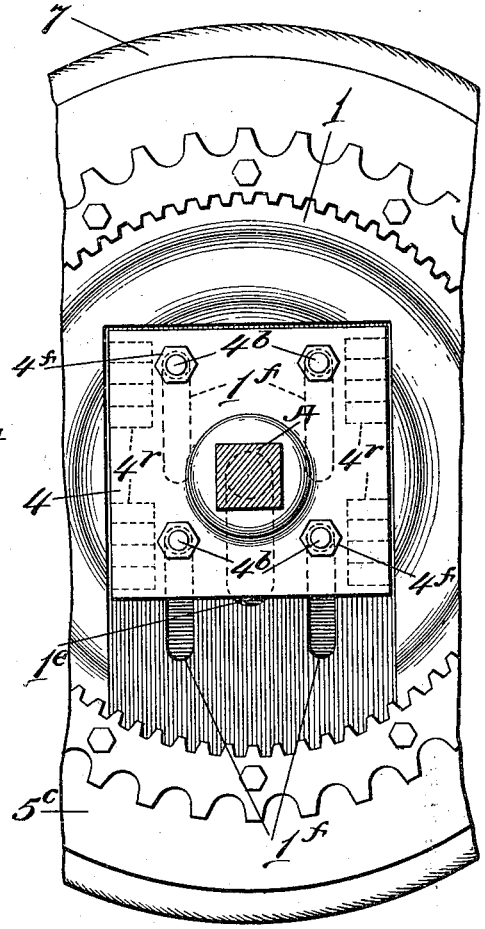
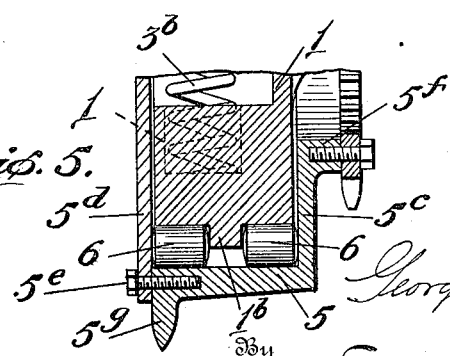
Witnesses
B. M. Offutt
W. Wallace Nairn Jr
Inventor
George W. Walk
By
Sowell & Sowell
Attorneys

UNITED STATES PATENT OFFICE.

GEORGE W. WALK, OF TYRONE, PENNSYLVANIA.

WHEEL.

1,193,639.  Specification of Letters Patent.  Patented Aug. 8, 1916.

Application filed October 19, 1915. Serial No. 56,670.

*To all whom it may concern:*

Be it known that I, GEORGE W. WALK, a citizen of the United States, residing at Tyrone, in the county of Blair and State of Pennsylvania, have invented certain new and useful Improvements in Wheels; and I do hereby declare that the following is a full, clear, and exact description thereof, reference being had to the accompanying drawings, which form part of this specification.

This invention is a novel improvement in vehicle wheels, and its object is to provide a wheel which will facilitate the propulsion of the vehicle by lessening the power required to move same and in which the wheel as a whole is floated or spring supported upon the axle or vehicle chassis or frame, the body of the wheel being non-rotatable, while the rim portion thereof is rotatable around such body. The rim portion of the wheel is preferably mounted by antifriction ball or roller bearings upon the body portion, and the tractive power may be applied to such rim portion, and the weight of the vehicle is transmitted through the body portion to the rim at a point close to the ground. In such a wheel the rim practically provides an endless anti-friction track on which the body of the wheel slides as the rim rotates, and said wheel as a whole being yieldingly connected with the axle or vehicle the durability of solid cushion tires which may be used with such wheels will be greatly enhanced as the shocks of impact of such tires with obstacles are lessened and cushioned. The springs and interior movable parts in the wheel body are concealed from view and protected from injury.

The invention is particularly adapted for use on trucks or vehicles designed to carry heavy loads and be operated at moderate speed; but the wheels can also be used on high speed vehicles.

I will describe the invention as embodied in the novel wheel shown in the accompanying drawings, and the claims summarize the features of construction and novel combinations of parts for which protection is desired.

In said drawings: Figure 1 is a front elevation of a wheel with the outer casing broken away to show the interior parts; Fig. 2 is a transverse horizontal section of the wheel on the line 2—2, Fig. 1; Fig. 3 is a vertical section through this wheel on line 3—3, Fig. 1; Fig. 4 is a detail rear view of the wheel in elevation, and partly broken; and Fig. 5 is a detail showing how the invention may be adapted for car wheels.

The wheel comprises a non-rotatable main body 1 and a rim rotatably surrounding the body.

The body 1 substantially approximates in diameter the diameter of the complete wheel and is provided with a circumferential peripheral flange $1^a$ on its front face, which flange $1^a$ is preferably formed with an external circumferential central rib $1^b$. The flange may also be provided at top with a series of internal lugs $1^c$, and at bottom with a series of internal sockets $1^d$, and the body is provided with a central vertical slot $1^e$ and a plurality of adjacent vertical slots $1^f$, hereinafter referred to.

At the front of the body, and within flange $1^a$, is a vertically movable casting 2, preferably provided with a base flange $2^a$ having a series of lugs $2^b$. Said casting 2 is suspended on the body by means of stout contractile springs 3, the upper ends of which are engaged with the lugs $1^c$, on the body and the lower ends with the lugs $2^b$ on the casting. The casting 2 may be further supported in the body by auxiliary expansive springs $3^b$, seated in the sockets $1^d$, springs $3^b$ which may be of different lengths or strength; the object being that more or less of these auxiliary springs will come into play according to the weight or pressure exerted upon the casting 2.

The casting 2 is capable of a limited vertical play or movement relative to the body 1, and it is rigidly connected with a bracket or casting 4, at the rear side of the body 1, by means of bolts $4^b$ which extend through corresponding apertures in the castings 2 and 4 and through the slots $1^f$ in the body 1; spacing sleeves $4^c$ being strung on these bolts intermediate the castings 2 and 4 or the bolts so formed that when the bolts are tightened by means of nuts $4^f$ the castings 2 and 4 will be rigidly bound together and become as one, and yet are together capable of vertical movement relative to the body 1. The sleeved bolts $4^b$ not only serve to connect the castings 2 and 4 together, but also serve as a means to guide the castings in their vertical movements relative to the body.

The casting 4 is to be attached to the vehicle or body to be mounted upon the wheels. As shown in full lines in Fig. 2 this casting is adapted to be fitted on the end of the axle A of a vehicle, the spindle S of such axle extending through the casting 4 and through the slot 1ᵉ in the body 1, and fitting into a suitable opening in the casting 2, and rigidly secured by means of a nut.

The casting 4 may be provided with a lateral extension 4ᵉ, indicated in dotted lines in Fig. 2, by which such casting may be bolted direct to the vehicle chassis or other suitable fixed portion of the vehicle or object to be mounted on the wheels. The shape of this casting 4 may be varied according to the manner or means by which it is desired to connect it to the vehicle or other body to be mounted upon the wheel.

To lessen the friction and facilitate the free vertical play of the castings 2 and 4 relative to the body 1, I preferably interpose anti-friction devices such as rollers 2ʳ between the opposed faces of the casting 2 and body 1, and similar devices 4ʳ between the opposed faces of the casting 4 and the body 1, and such devices may be conveniently retained in operative position in recesses in the castings, as indicated in Fig. 2, so that such rollers permit the castings to move vertically relative to the body without undue friction.

It will be seen that the axle or vehicle will be floatably supported by the springs 3 and 3ᵇ upon the wheel body 1, although said body cannot rotate.

Surrounding the body 1 is an annular rim 5, which is slightly larger in internal diameter than the external diameter of the flange 1ᵃ and is preferably supported upon said flange and positioned thereon by means of anti-friction bearings. I preferably use two series of roller bearings, interposed between the rim and the body at opposite sides of the rib 1ᵇ as shown. Furthermore, I preferably make every other roller or ball 6ᵃ of less diameter than the other rollers 6; the smaller rollers or balls 6ᵃ serving merely as spacing rollers or balls and not as supporting rollers or balls, thereby greatly reducing friction, and as the spacing rollers do not hinder or retard the rotation of the supporting rollers a great deal less friction is developed than would result if all the rollers or balls were of equal diameter.

I prefer to use rollers as they have greater bearing surface, but obviously balls could be used in lieu of the rollers. The inner series of rollers is confined between the inwardly projecting annular flange 5ᶜ on the rear edge of the rim and the annular rib 1ᵇ. The outer series of rollers is confined between the rib 1ᵇ and a face plate or disk 5ᵈ attached to the outer edge of the rim 5 by means of bolts 5ᵉ, or other suitable fastenings, as indicated in the drawings.

The inner flange 5ᶜ of the rim has adjacent its inner edge an outwardly projecting flange 5ᶠ to which may be rigidly attached the driving means or gear, which may be either a sprocket gear or an internal gear, (both being indicated in the drawings,) so that the wheel may be driven either by a sprocket chain from a driven sprocket (not shown) as usual manner in some vehicles, or can be engaged with a driving pinion (not shown) as usual in other vehicles. The rim is preferably provided with a cushion tire 7 which may be solid. The rim might be provided with a flange 5ᵍ as indicated in Fig. 5 to enable the wheel to be used for street railway cars and the like.

Operation: The only rotatable part of the wheel is the rim, the body being fixed, and such rim being rotatable upon the body; but the vehicle is "floated", or spring supported, upon the body of the wheel so that all the load on the vehicle, and the shock of impact of the wheel with any obstruction in the road is compensated for by the springs; the wheel body having a vertical movement eccentric to the axle or casting 4 upon which it is supported. The wheel is moved by power applied to the rim, and as the body has practically a roller bearing upon the rim, when the rim is rotating the vehicle progresses; the rollers practically form an endless frictionless roller path which is automatically laid down in front of the body, as the latter moves forward so that the vehicle practically glides or slides along upon the rollers. By reason of the employment of rollers or balls of different diameters alternately, as described, a large amount of friction which would result if the rollers or balls were all of the same diameter is obviated.

The springs 3 are sufficient to support the vehicle under ordinary conditions; but if the vehicle drops into a rut, or the wheel strikes an obstruction which causes an extra strain upon the springs 3, the supplemental springs 3ᵇ come into play and absorb the shock. By reason of this cushioning effect of the springs the durability of the cushion tires used on such wheels will be greatly enhanced, because the wheel body will yield relative to the vehicle when the wheel strikes an obstruction, and consequently the shock of impact of the cushion tire with such obstruction is greatly reduced thereby greatly lessening wear and tear on the cushion tire.

What I claim is:

1. In a vehicle wheel, the combination of a main body, a casting slidably mounted on the front of said body, springs supporting this casting on the body; a second casting at the rear of said body rigidly connected with the front casting, said rear casting being adapted to be attached to the vehicle or body mounted on said wheel, an annular rim rotatably fitted around said body, anti-friction bearings interposed between the rim and body, a plate covering the front of the body, and means connected with the rim whereby power may be transmitted to the rim to rotate same, substantially as described.

2. A vehicle wheel comprising a body having a peripheral annular flange provided with vertically disposed slots, vertically movable castings at front and rear of said body, bolts extending through said slots and rigidly uniting said castings, springs suspended from the upper portion of the body and connected to the lower end of the front casting, an annular rim fitted around the periphery of the body, anti-friction bearings interposed between the opposed peripheral faces of the rim and body, a means attached to the rim whereby the latter may be rotated upon the body, and means for attaching the outer casting to the vehicle.

3. A vehicle wheel comprising a body having a peripheral annular flange provided with vertically disposed slots, movable castings at front and rear of said body, said rear casting being attachable to the vehicle to be mounted on such wheel, bolts extending through said slots and rigidly uniting said castings, springs suspended from the upper portion of the body and connected to the front casting, an annular rim fitted around the periphery of the body, anti-friction bearings interposed between the opposed peripheral faces of the rim and body, means connected with the rim whereby power may be transmitted to the rim causing the same to rotate, and supplemental compression springs interposed between the lower side of the inner casting and the lower portion of the body.

4. The herein described wheel comprising a circular slotted body having a peripheral annular flange, a slidable casting at the front of said body, a slidable casting at the rear of the body adapted to be connected with a vehicle, bolts rigidly connecting said castings and extending through slots in the said body, spacers interposed between the said castings and extending through said slots, anti-friction devices interposed between said castings and the body, springs suspending the inner casting from the upper portion of the body flange, supplemental compression springs interposed between said casting and the lower part of the body flange, an annular rim surrounding said body, a series of roller bearings interposed between the opposed peripheries of the body flange and the rim, a disk attached to the outer edge of said flange and covering the outer face of the body, and an annular gear attached to the rear face of said rim.

5. A vehicle wheel comprising a body provided with vertically disposed slots, said body having a peripheral annular flange provided with a rib on its outer face, opposed movable castings at front and rear of said body, said rear casting being rigidly attached to the vehicle, bolts and spacing means interposed between said castings and extending through said slots and rigidly uniting said castings, a series of springs suspended from the upper portion of the flange of the body and connected to the lower end of the front casting and suspending the same, an annular rim fitted around the periphery of the body, a disk attached to the rim and covering the outer face of the body, means attached to the rim whereby power may be transmitted to the rim causing the same to rotate, and supplemental compression springs interposed between the lower side of the inner casting and the lower portion of the body, a series of anti-friction bearings on opposite sides of said rib interposed between the body and the rim—said bearings being composed of a series of alternately large and small rollers, substantially as described.

In testimony that I claim the foregoing as my own, I affix my signature in presence of two witnesses.

GEORGE W. WALK.

Witnesses:
T. T. SHIRK,
W. W. BOWERS.